(12) United States Patent  
Trenkle et al.

(10) Patent No.: US 8,947,241 B2  
(45) Date of Patent: Feb. 3, 2015

(54) ANIMAL TRACKING APPARATUS AND METHOD

(71) Applicant: Garmin Switzerland GmbH, Schaffhausen (CH)

(72) Inventors: Bradley C. Trenkle, Prairie Village, KS (US); Timmy R. Walker, Prairie Village, KS (US)

(73) Assignee: Garmin Switzerland GmbH (CH)

( * ) Notice: Subject to any disclaimer, the term of this patent is extended or adjusted under 35 U.S.C. 154(b) by 144 days.

(21) Appl. No.: 13/769,556

(22) Filed: Feb. 18, 2013

(65) Prior Publication Data

US 2014/0232541 A1 Aug. 21, 2014

(51) Int. Cl.
  *G08B 23/00* (2006.01)
  *A01K 15/02* (2006.01)
  *A01K 11/00* (2006.01)

(52) U.S. Cl.
  CPC ............. *A01K 15/021* (2013.01); *A01K 11/008* (2013.01)
  USPC ................................... 340/573.3; 340/539.13

(58) Field of Classification Search
  CPC ..................................................... A01K 11/008
  See application file for complete search history.

(56) References Cited

U.S. PATENT DOCUMENTS

| 5,857,433 | A | 1/1999 | Files ............................ 119/720 |
| 6,535,131 | B1* | 3/2003 | Bar-Shalom et al. ...... 340/573.1 |
| 7,602,302 | B2 | 10/2009 | Hokuf et al. ............... 340/573.3 |
| 7,819,087 | B2 | 10/2010 | Napolez et al. ............. 119/721 |
| 8,065,978 | B2 | 11/2011 | Duncan et al. ............. 119/721 |
| 2008/0036610 | A1* | 2/2008 | Hokuf et al. ............... 340/573.3 |
| 2009/0025651 | A1* | 1/2009 | Lalor ........................... 119/719 |

OTHER PUBLICATIONS

Geo-fence from Wikipedia, published prior to Feb. 18, 2013.
Gundogsupply.com review of SportDOG TEK, published prior to Feb. 18, 2013.
U.S. Appl. No. 13/769,562, filed Feb. 18, 2013.

* cited by examiner

*Primary Examiner* — Daniel Wu
*Assistant Examiner* — Frederick Ott
(74) *Attorney, Agent, or Firm* — Samuel M. Korte; Mohammad M. Ali

(57) ABSTRACT

An animal tracking apparatus includes a location determining component; a sensor operable to sense a condition of the animal; memory; and a processor. The processor is operable to automatically store location information corresponding to the current geographic location of the apparatus in response to a sensed condition of the animal. The processor is also operable to monitor the sensor to identify a desired response to a received command and to store response information corresponding to the response.

20 Claims, 8 Drawing Sheets

ANIMAL TRACKING APPARATUS AND METHOD

BACKGROUND

It is often desirable to track animals for training purposes and/or to ensure they do not get lost or otherwise harmed. For instance, hunting dogs are often equipped with tracking devices that communicate with handheld remotes so that handlers may monitor their locations while hunting or training. Existing tracking devices adequately track the locations of animals but provide little additional information that may be useful when training and/or tracking the animals.

SUMMARY

Embodiments of the present technology provide an animal tracking apparatus that tracks the locations of animals and monitors and provides other useful information.

An animal tracking apparatus constructed in accordance with embodiments of the invention is configured to be worn by a dog or other animal. The tracking apparatus generally includes a location determining component operable to determine a current geographic location of the apparatus; a sensor operable to sense a condition of the animal wearing the apparatus; memory; and a processor. In one embodiment, the processor is operable to receive from the sensor information indicative of the sensed animal condition and to acquire and store location information corresponding to the current geographic location of the apparatus in response to the sensing of the animal condition. The processor may store the location information as a waypoint at which the condition of the animal was sensed. The processor may also automatically store condition information corresponding to the sensed animal condition and associate the condition information with the location information in the memory for later transmission and/or analysis.

In one embodiment, the sensor is a microphone or other sound sensing device, and the sensed animal condition includes barking or other sounds made by the animal. The processor may monitor an output of the microphone and store location information for the current location of the apparatus whenever barking is sensed. In some embodiments, the processor may compare the sounds to a threshold volume or duration or spectral content and store the location information only when the sounds exceed the threshold or match the spectral content.

An animal tracking apparatus constructed in accordance with various embodiments of the invention comprises a location determining component operable to determine a current geographic location of the apparatus; a communication component operable to receive a command from a remote unit; a sensor operable to sense a response to the command made by the animal; memory; and a processor. The processor is operable to monitor the sensor to identify a response to a received command and to store response information corresponding to the response in the memory. For example, the processor may monitor the sensor to determine if the animal stops and changes direction in response to a "return" command. In some embodiments, the processor may monitor a time duration between receipt of a command and the response of the animal and store corresponding time information in the memory.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

Figure 11:
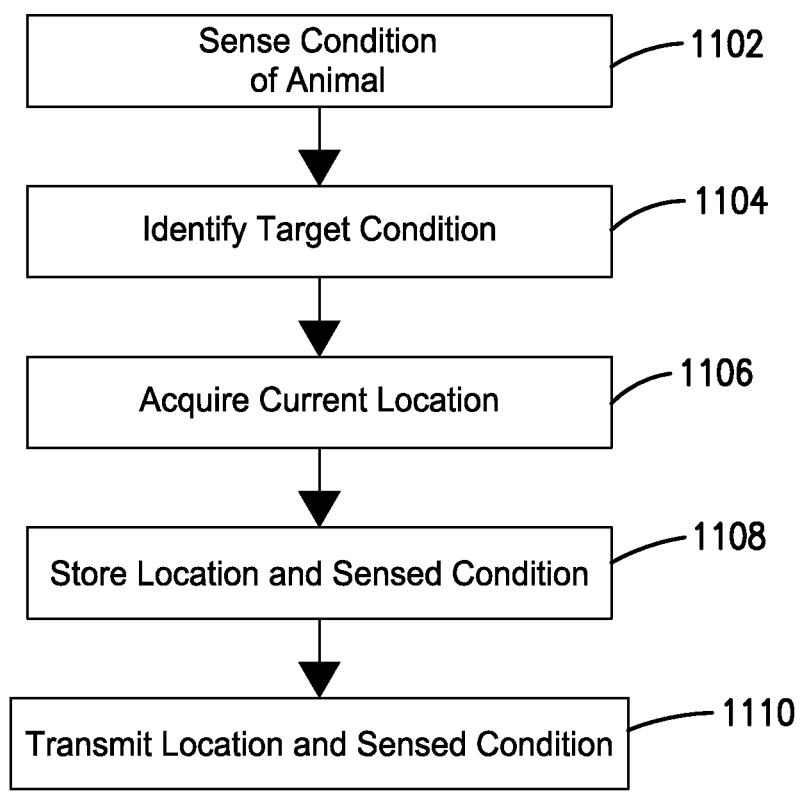
Figure 12:
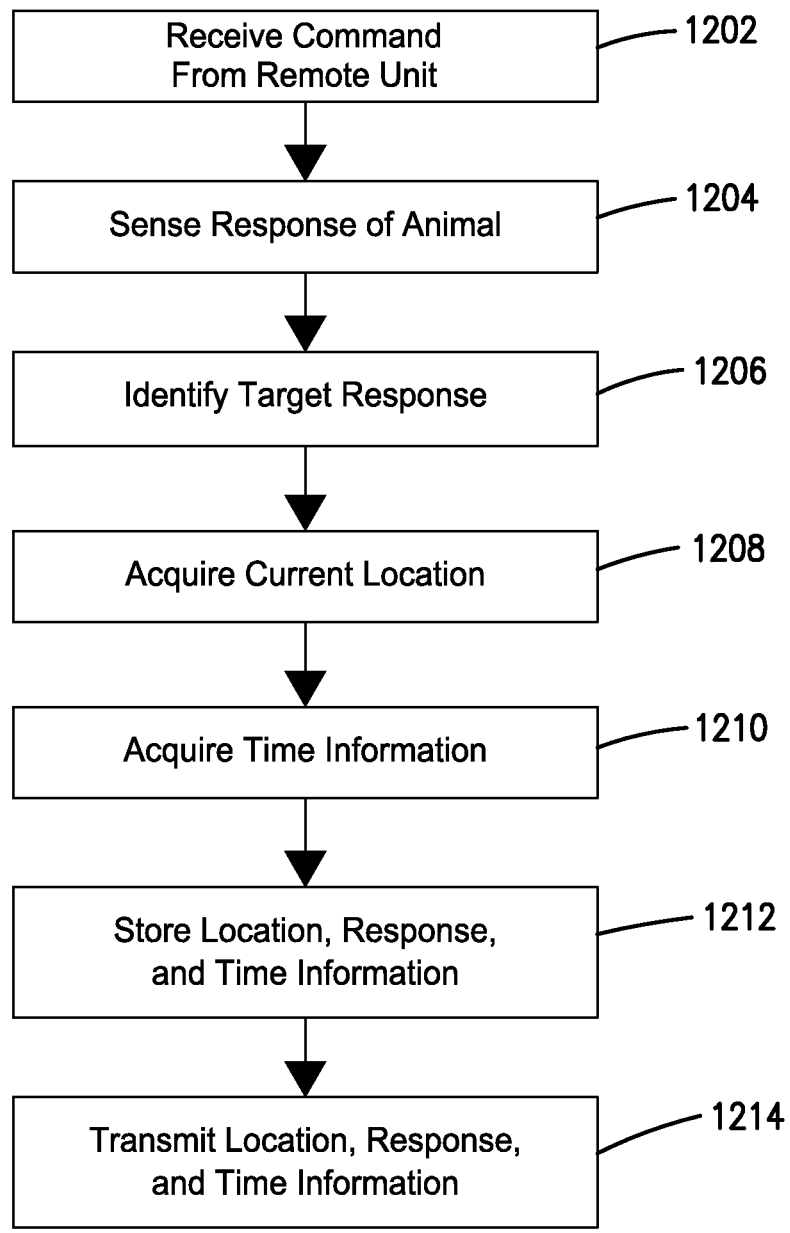

FIG. 11 a flow chart showing steps that may be performed by or with the tracking apparatus; and FIG. 12 is a flow chart showing other steps that may be performed by or with the tracking apparatus.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
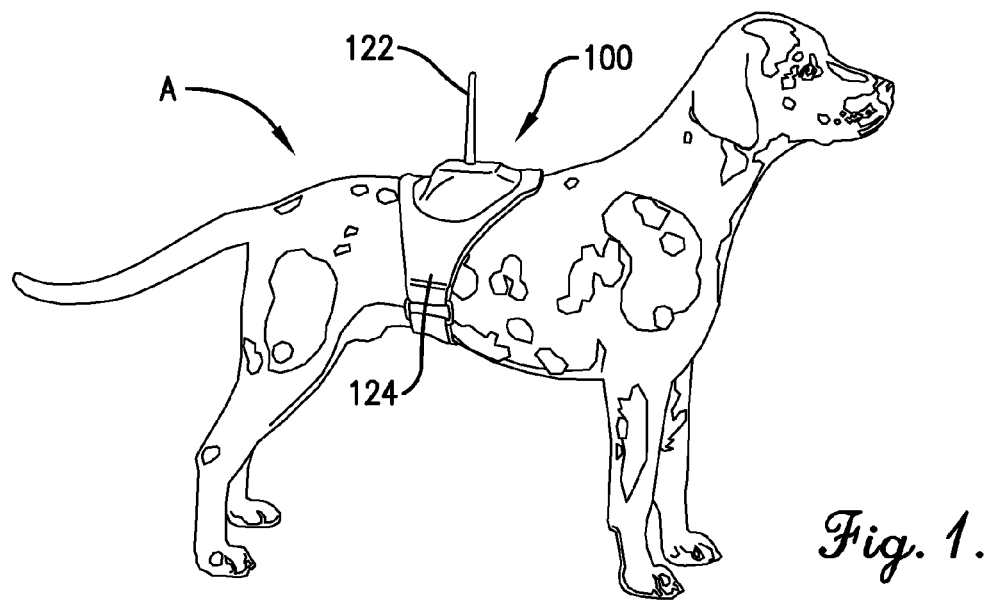
FIG. 1 is a perspective view of an animal tracking apparatus configured in accordance with various embodiments of the present invention shown coupled to a dog with a body harness.
Figure 2:
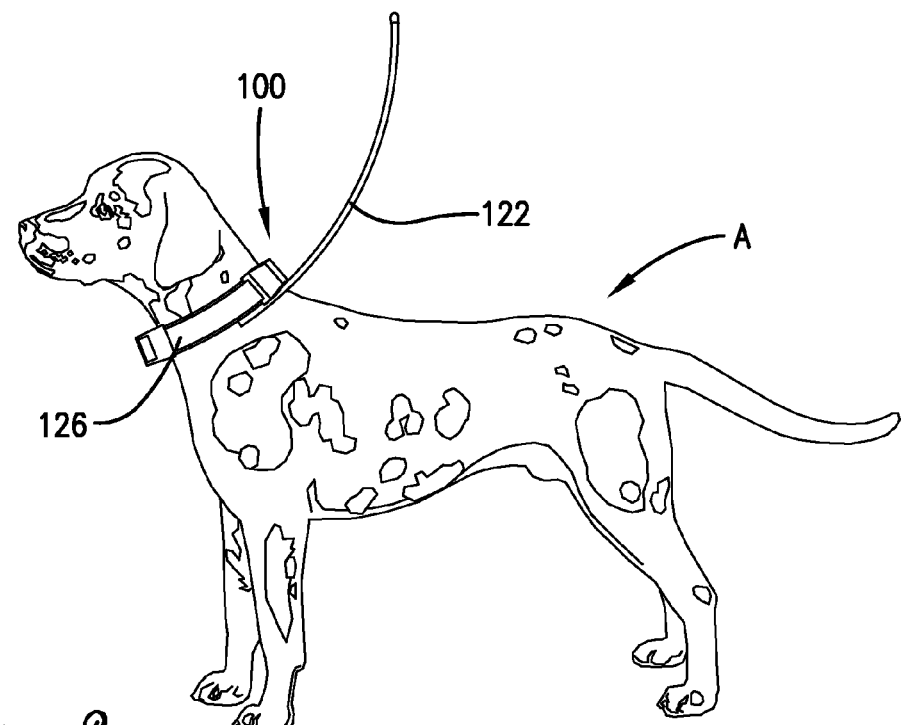
FIG. 2 is a perspective view showing an embodiment of the tracking apparatus coupled to a dog with a dog collar.
Figure 3:
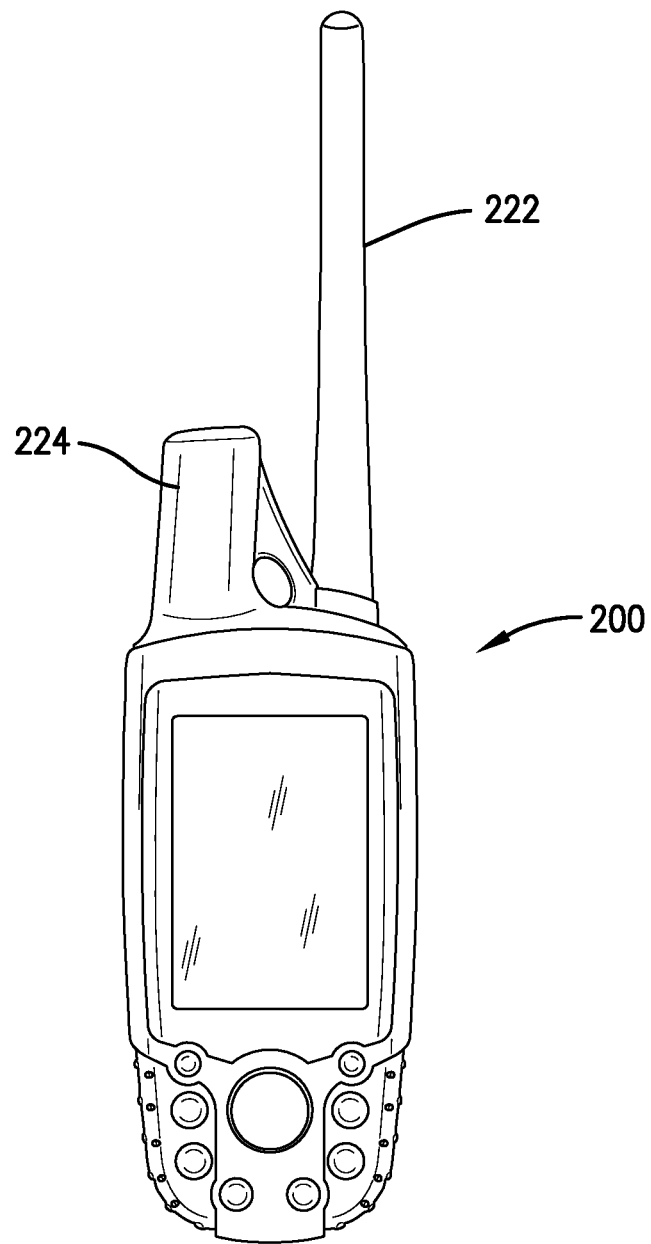
FIG. 3 is a front view of a portable navigation unit configured in accordance with various embodiments of the invention.
Figure 6:
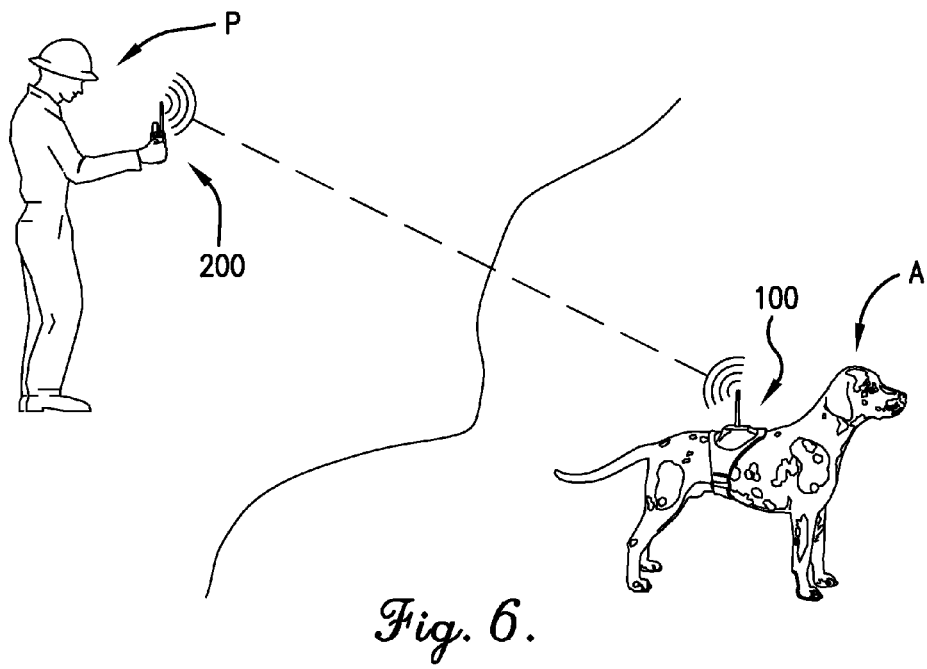
FIG. 6 is a schematic diagram showing a person using the navigation unit to communicate with the tracking apparatus.

Embodiments of the present invention may be implemented with an animal tracking apparatus 100 shown in FIGS. 1 and 2 and a portable navigation unit 200 shown in FIG. 3. As shown in FIG. 6, the animal tracking apparatus 100 may be worn by or otherwise attached to a dog or other animal A, and the portable navigation unit 200 may be used by an owner of the animal, a trainer, or other person P. Embodiments of the animal tracking apparatus 100, portable navigation unit 200, and other components are described below.

As described in detail below, embodiments of the tracking apparatus 100 may sense a condition of the animal A and automatically store location information corresponding to the geographic location of the apparatus where the condition was sensed. The tracking apparatus may store the location information as a waypoint at which the condition of the animal was sensed. The tracking apparatus may also store condition information corresponding to the sensed animal condition and associate the condition information with the location information in memory. For example, the tracking apparatus 100 may sense barking or other sounds made by the animal, and in response to the barking, store location information for the location of the apparatus where the barking was sensed.

Other embodiments of the tracking apparatus 100 may receive a command from the navigation unit 200 or other external device and sense a response made by the animal to the command. The tracking apparatus 100 may then store information corresponding to the command and the response in memory. For example, the tracking apparatus 100 may receive a "return" command from the navigation unit 200, determine if the animal stops and heads back toward the user of the navigation unit 200 in a response to the "return" command, and stores information for both the command and the response in memory. In some embodiments, the tracking apparatus may monitor a time duration between receipt of the command and the response of the animal and store corresponding time information in memory. These and other aspects of the technology are described in more detail below.

Embodiments of the tracking apparatus 100 and navigation unit 200 will now be described in more detail. Referring initially to FIGS. 1, 2, 3, and 6, the tracking apparatus 100 may be any portable electronic device that can be worn by or otherwise attached to a dog or other animal A and that is operable to determine its current geographic location. Likewise the navigation unit 200 may be any portable electronic device that can communicate with the tracking apparatus 100. In some embodiments, the tracking apparatus 100 transmits the location of the animal A and other information to the portable navigation unit 200. However, the animal tracking apparatus 100 and portable navigation unit 200 are not necessarily used in combination, as the animal tracking apparatus 100 and/or portable navigation unit 200 may function and exist independently of each other.

Figure 5:
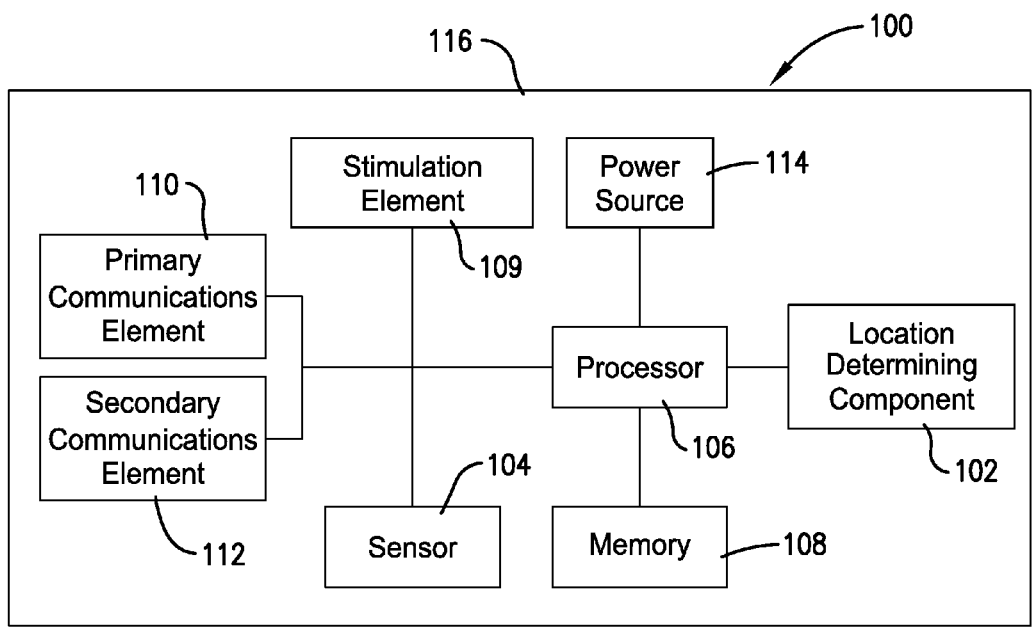
FIG. 5 is a block diagram showing some of the components of the tracking apparatus of FIG. 1 or 2.

One embodiment of the tracking apparatus 100 is shown schematically in FIG. 5 and generally includes a location determining component 102 operable to determine a current geographic location of the apparatus; a sensor 104 operable to sense a condition of the animal to which the apparatus is coupled; a processor 106 coupled with the location determining component and the sensor; and memory 108 coupled with the processor 106. The tracking apparatus may also include, or be connected with, a stimulation element 109. Embodiments of the tracking apparatus 100 may also include a primary communications element 110 and a secondary communications element 112 operable to communicate with the portable navigation unit 200 or another external device, a power source 114 for powering the components of the apparatus 100, and a housing 116 for housing or supporting the components of the apparatus 100.

The location determining component 102 may be a Global Navigation Satellite System (GNSS) receiver such as a Global Positioning System (GPS) receiver, a GLONASS receiver, a Galileo receiver, or a similar device and is adapted to provide, in a substantially conventional manner, geographic location information for the tracking apparatus 100. The location determining component 102 may be, for example, a GPS receiver much like those disclosed in U.S. Pat. No. 6,434,485, which is incorporated herein in its entirety by specific reference. In some embodiments, the location determining component 102 may include a high sensitivity GPS receiver to facilitate determination of the geographic locations of the apparatus 100 when the apparatus 100 is shielded from the sky, such as where the apparatus 100 is in heavy tree cover or brush. However, the location determining component 102 may receive cellular or other positioning signals utilizing other various methods to facilitate determination of geographic locations without being limited to GPS. In some configurations, the GNSS receiver may be configured to receive signals from a plurality of satellite constellations, such as both GPS and GLONASS.

Figure 7:
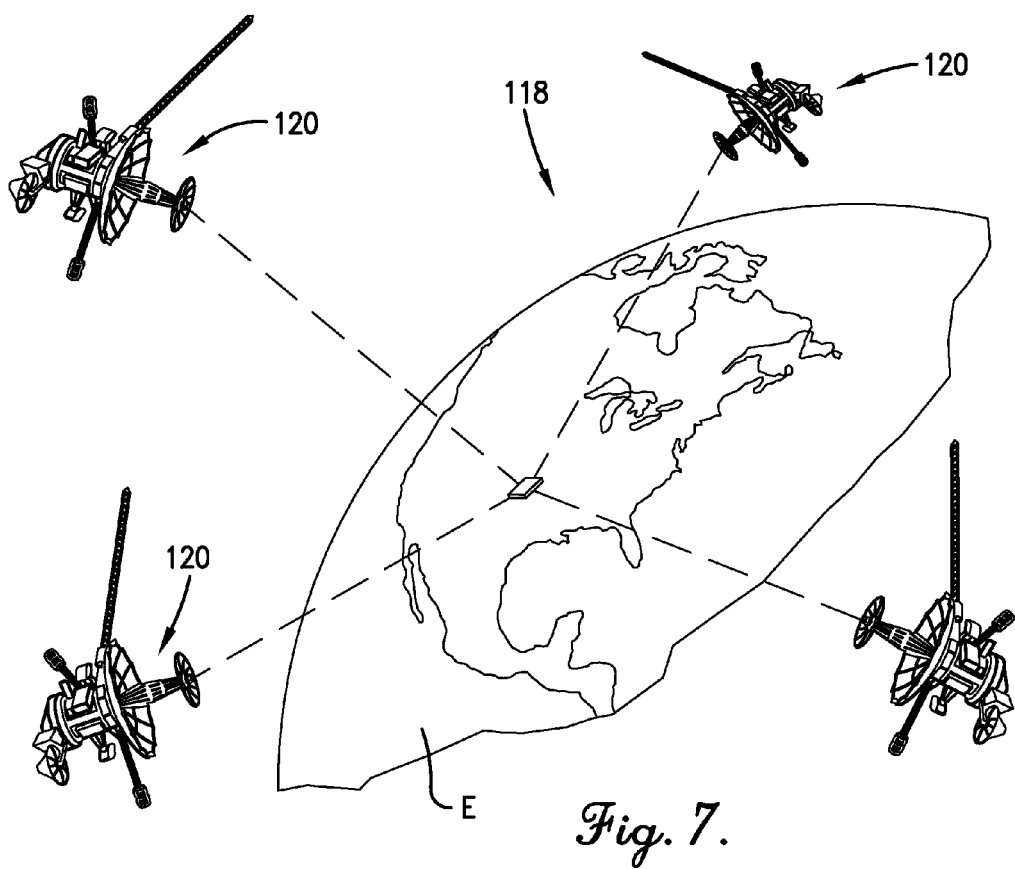
FIG. 7 is schematic diagram of a Global Positioning System (GPS) that may be used by various embodiments of the invention.

The GPS is a satellite-based radio navigation system that allows determination of navigation information, such as position, velocity, time, and direction, for an unlimited number of users. Formally known as NAVSTAR, the GPS incorporates a plurality of satellites that orbit the earth. FIG. 7 shows one representative view of a GPS denoted generally by reference number 118. A plurality of satellites 120 are in orbit about the Earth E. The orbit of each satellite is not necessarily synchronous with the orbits of other satellites and, in fact, is likely asynchronous. The tracking apparatus 100, including the location determining component 102, is shown receiving GPS satellite signals from the various satellites 120.

The location determining component 102 may also include various processing and memory elements to determine the geographic location of the tracking apparatus 100 itself or it may provide information to the processor 106 to enable the processor 106 to determine the geographic location of the tracking apparatus 100. Thus, the location determining component 102 need not itself calculate the current geographic location of the tracking apparatus 100 based upon received signals. The location determining component 102 also may include an antenna for receiving signals, such as a GPS patch antenna or quadrifilar helical antenna. The antenna utilized by the location determining component 102 may be enclosed within the housing 116.

The location determining component 102 may be integral with the processor 106 and/or the memory 108 such that the location determining component 102 may be operable to perform the various functions described herein. Thus, the processor 106 and location determining component 102 need not be separate or otherwise discrete elements.

The location determining component 102 need not directly determine the current geographic location of the tracking apparatus 100. For instance, the location determining component 102 may determine the current geographic location by receiving information or data utilizing the communications elements 110, 112.

The sensor 104 is operable to sense a condition of the animal A to which the apparatus is attached. Upon sensing a condition, the sensor 104 provides a signal and/or data corresponding to the sensed condition to the processor 106. The sensor 104 may be operable to periodically or continuously sense animal conditions such that the processor 106 may be provided with periodic or constant animal condition information.

In various embodiments, the sensor 104 is a microphone or other sound detecting device that is tuned or otherwise configured to sense barking and/or other sounds emitted by the animal. As explained in more detail below with reference to the flow diagrams, the processor 106 may monitor an output of the microphone and store location information for the current location of the apparatus whenever barking is sensed. In some embodiments, the processor 106 may compare the sounds to a threshold volume or duration or to spectral content (e.g., frequency, multiple frequencies a band of frequency content, amplitudes of each frequency, and the like) and automatically store the location information only when the sounds exceed the threshold or match the content as is also described below.

The sensor 104 may also, or alternatively, include an animal temperature sensor to sense the temperature of the animal; a biometric sensor to sense other biometric characteristics of the animal such as heart rate and/or breathing rate; an orientation sensor such as a tilt-compensated three-axis compass, gyroscope, tilt sensor, or level switch to determine the orientation of the housing 116 and the posture of the animal; and/or a movement sensor such as an accelerometer to determine the velocity and/or acceleration of the animal independent of the location determining component 102. In some configurations, the sensor 104 may be the location determining component 102, or be integrated with the location determining component 102, to determine the current geographic location of the animal. The tracking apparatus may also include other sensors for sensing ambient conditions such as an ambient temperature sensor to sense the temperature of the air surrounding the tracking apparatus 100, an ambient humidity sensor to sense the humidity of the air surrounding the tracking apparatus 100, a liquid sensor to sense if the tracking apparatus 100 is dry, wet, or submerged in water, etc.

The tracking apparatus may also include a monitor for monitoring the remaining capacity of the power source 114, a contact sensor to sense if the housing 116 is in appropriate contact with an animal collar or harness, a contact sensor to sense if the housing 116 is intact or damaged, and/or a signal sensor coupled with one or both of the communications elements 110, 112 to sense the strength of a received signal.

The sensor 104 may include any number and/or combination of sensing elements to sense a plurality of conditions. In some embodiments, the sensor 104 may be integral with other tracking apparatus 100 elements, such as the processor 106 or location determining component 102.

The processor 106 is coupled with the location determining component 102, the sensor 104, the memory 108, the communications elements 110, 112, and other tracking apparatus 100 elements through wired or wireless connections, such as a data bus, to enable information to be exchanged between the various elements. Further, the processor 106 may be operable to control functions of the tracking apparatus 100 according to a computer program, including one or more code segments, or other instructions associated with the memory 108 or with various processor logic and structure. The processor 106 may comprise various computing elements, such as integrated circuits, microcontrollers, microprocessors, programmable logic devices, etc, alone or in combination, to perform the operations described herein.

As described above, the processor 106 may determine a current geographic location of the tracking apparatus 100 by receiving geographic location information from the location determining component 102. Alternatively, the processor 106 may independently determine geographic locations based on information and/or data, such as received navigation signals, provided by the location determining component 102, stored within the memory 108, or acquired from other devices or elements. The processor may also receive location information from another device through the communications elements 110, 112.

The memory 108 is directly or indirectly coupled with the processor 106 and is operable to store various data utilized by the processor 106 and/or other elements of the tracking apparatus 100. The memory 108 may include removable and non-removable memory elements such as RAM, ROM, flash, magnetic, optical, USB memory devices, combinations thereof, and/or other conventional memory elements. The memory 108 may also be integral with the processor 106, such as in embodiments where the memory 108 comprises internal cache memory.

The memory 108 may store various data associated with operation of the tracking apparatus 100, such as a computer program, code segments, or other data for instructing the processor 106 and other tracking apparatus 100 elements to perform the steps described below. Further, the memory 108 may store various data recorded, detected, or otherwise generated by the tracking apparatus 100, such as current and previous geographic locations of the tracking apparatus 100, current and previously sensed conditions, operational characteristics of the tracking apparatus 100, etc. Further, the various data stored within the memory 108 may be associated within a database to facilitate retrieval of information by the processor 106.

The primary communications element 110 is coupled with the processor 106 and is operable to transmit information and/or data from the tracking apparatus 100 to the navigation unit 200 or other external devices. The primary communications element 110 may be operable to transmit data and information over substantial distances, such as a distance greater than a half mile, utilizing radio frequency signals. In one embodiment, the primary communications element 110 includes a VHF transmitter operable to transmit data and information on various VHF bands. Use of a VHF transmitter enables the tracking apparatus 100 to efficiently transmit information with limited interference over long distances. However, the primary communications element 110 may utilize any radio or non-radio methods to communicate with external devices.

The primary communications element 110 may include an antenna 122 to facilitate transmission of data and information from the tracking apparatus 100. In embodiments employing a VHF transmitter, the antenna 122 may include a VHF helical whip antenna to maximize the broadcast range of the primary communications element 110. However, the antenna 122 may include any antenna elements and is not limited to utilization of a VHF helical whip antenna.

As shown in FIGS. 1 and 2, the antenna 122 may protrude from the housing to enable the antenna 122 to transmit data and information over significant distances. The antenna 122 may be removably coupled with the housing 116 and other tracking apparatus 100 elements to enable the antenna 122 to be easily replaced should it become damaged during use and to further enable the tracking apparatus 100 to be compactly transported when not in use. However, in some embodiments the antenna 122 may be permanently coupled with the housing 116 to reduce the complexity of the tracking apparatus 100. In some embodiments, the antenna 122 may also be enclosed entirely within the housing 116.

The primary communications element 110 may only transmit data and information from the tracking apparatus 100 or may be operable to both transmit and receive information to and from external devices or otherwise engage in bi-directional communication. For instance, the primary communications element 110 may be operable to transmit data and to receive data from the portable navigation unit 200 or other external device and store the received data within the memory 108 for use by the processor 106.

The secondary communications element 112 is also coupled with the processor 106 and is operable to communicate with the portable navigation unit 200 or other external devices independent of the primary communications element 110. The secondary communications element 112 may use WiFi (802.11), Bluetooth, ultra-wideband (UWB), Wi-Max, Wireless USB, ZigBee, IRDA, and/or other conventional wireless data transfer protocols to efficiently transfer data between the tracking apparatus 100 and the navigation unit 200. Thus, in embodiments where the primary communications element 110 employs VHF or other radio frequency signals that are efficient for long-range communication but inefficient or ineffective for rapid data transfer, the secondary communications element 112 enables the tracking apparatus 100 and navigation unit 200 to rapidly exchange data to facilitate operation of the present invention. For instance, the secondary communications element 112 may receive data and information from the navigation unit 200 and store the received data and information within the memory 108 for use by the processor 106. The secondary communications element 112 may also receive data and information from the navigation unit 200 for configuration purposes.

The power source 114 provides electrical power to components of the tracking apparatus 100 such as the location determining component 102, processor 106, memory 108, sensor 104, and/or communications elements 110, 112. The power source 114 may comprise conventional power supply elements, such as batteries, battery packs, fuel cells, solar cells and solar power elements, etc. The power source 114 may also comprise power conduits, connectors, and receptacles operable to receive batteries, battery connectors, or power cables. For example, the power source 114 may include both a battery to enable portable operation and a power input for receiving power from an external source such as an electrical outlet.

The housing 116 houses and encloses at least portions of the processor 106, the location determining component 102, the memory 108, the sensor 104, the power source 114, and the communications elements 110, 112. The housing 116 may be substantially waterproof and formed of durable and rigid materials to enable the tracking apparatus 100 to be utilized in potentially inclement conditions, such as those encountered outdoors while hunting.

As shown in FIG. 1, the housing 116 may be configured for coupling with a body harness 124 or other belt-like apparatus that is operable to be secured around the animal's mid-section. Alternatively, as shown in FIG. 2, the housing 116 may be configured for coupling with a dog collar 126 to facilitate securement of the tracking apparatus around the animal's neck. As shown in FIGS. 1 and 2, the configuration of the housing 116, the antenna 122, the body harness 124, and the collar 126 ensures that the antenna 122 is oriented properly, i.e. upwards, regardless of the general position of the animal to which the housing 116 is coupled.

The stimulation element 109 may provide stimulation to the animal A to encourage a desired result. For example, the animal may be trained to recognize stimulation(s) applied by the stimulation element 109 and to perform a desired action in response to the stimulation(s). In various configurations, the stimulation element 109 may be operable to provide varying levels of electrical stimulation to the animal A. In addition to, or as an alternative to electrical stimulation, the stimulation element 109 may be operable to provide acoustic (tonal), optical, olfactory (scents such as citronella), vibratory, or other forms of stimulation. For instance, the stimulation element 109 may include a speaker, lights, a vibratory element, and/or other training aids in order to provide any desired form of stimulation to the animal. The stimulation element 109 may be embedded in the harness 124 and/or the collar 126.

Figure 4:
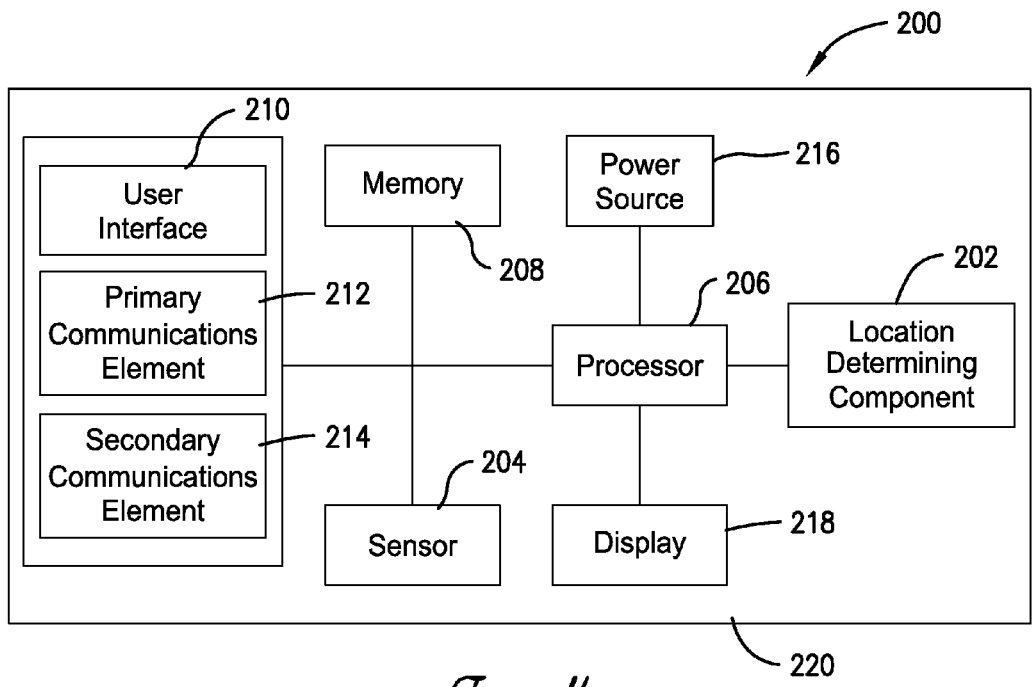
FIG. 4 is a block diagram showing some of the components of the navigation unit of FIG. 3.

Embodiments of the portable navigation unit 200 will now be described with reference to FIGS. 3 and 4. The navigation unit 200 may be any portable electronic device that is operable to communicate with the tracking apparatus 100 and display information. An embodiment of the navigation unit 200 may include a location determining component 202 operable to determine a current geographic location of the unit; a sensor 204 operable to sense a condition of the navigation unit 200; a processor 206; memory 208 coupled with the processor 206 and operable to store information; a user interface 210; a primary communications element 212 and a secondary communications element 214 operable to communicate with the tracking apparatus 100; a power source 216 for powering various unit 200 elements; a display 218 for displaying information generated by the processor 206, and a housing 220 for housing various navigation unit 200 elements.

The location determining component 202, processor 206, and memory 208 are generally similar or identical to the location determining component 102, processor 106, and memory 108 of the tracking apparatus 100 discussed above and are therefore not described in detail again. However, in some embodiments the location determining component 202 and memory 208 may include additional capabilities, such as additional processing power, greater memory capacity, reduced component access time, or GPS precision, beyond those provided by the components of the tracking apparatus 100 due to the additional navigation features provided by the navigation unit 200 discussed below. For instance, the memory 208 may comprise multiple memory elements, such as internal RAM, internal flash memory, and removable flash memory elements.

The sensor 204 may include a tilt compensated three-axis magnetic compass operable to determine the heading or general orientation of the navigation unit 200. Determining the orientation or heading of the navigation unit 200 facilitates tracking of the tracking apparatus 100 by providing the user with an accurate bearing to the tracking apparatus 100. In some embodiments the sensor 204 may additionally include a MEMS-based pressure sensor to sense ambient conditions around the navigation unit 200 or to determine altitude, weather trends, etc.

The user interface 210 enables the person P or other users, third parties, or other devices to share information with the navigation unit 200. The user interface 210 may comprise one or more functionable inputs such as buttons, switches, scroll wheels, etc, a touch screen associated with the display 218, voice recognition elements such as a microphone, pointing devices such as mice, touchpads, trackballs, styluses, a camera such as a digital still or video camera, combinations thereof, etc. Further, the user interface 210 may comprise wired or wireless data transfer elements such as removable memory including the memory 208, data transceivers, etc, to enable the user and other devices or parties to remotely interface with the navigation unit 200.

The user interface 210 may provide various information to the user utilizing the display 218 or other visual or audio elements such as a speaker. Thus, the user interface 210 enables the user and navigation unit 200 to exchange information, including tracking information, geographic entities, navigation unit and tracking apparatus configuration, security information, preferences, route information, points of interests, alerts and alert notification, navigation information, waypoints, a destination address, etc.

The primary communications element 212 enables the navigation unit 200 to receive information and/or data transmitted by the tracking apparatus 100 or another device. The primary communications element 212 may be any device or combination of devices operable to receive a signal, such as a receiver coupled with an antenna. The primary communications element 212 may be operable to only receive signals transmitted by other devices, such as the tracking apparatus 100, or may be operable to both receive and transmit signals.

The primary communications element 212 is compatible with the primary communications element 110 to enable the navigation unit 200 to easily receive data and information from the tracking apparatus 100. For example, in embodiments where the primary communications element 110 includes a VHF transmitter, the primary communications element 212 may include a corresponding VHF receiver. However, in some embodiments, the primary communications element 212 may include a multi-band receiver and/or scanner operable to identify and receive signals transmitted on multiple frequencies or bands.

The primary communications element 212 may include an antenna 222 as shown in FIG. 3 to facilitate reception of signals transmitted by the tracking apparatus 100. In embodiments where the communications element 212 comprises a VHF receiver, the antenna 222 may comprise a VHF helical whip antenna. The antenna 222 may be permanently or removably coupled with the housing 220 or be entirely enclosed therein.

The antenna 222 may be integral or discrete with an antenna utilized by the location determining component 202. For instance, as shown in FIG. 3, the navigation unit 200 may include both the antenna 222 to receive signals from the tracking apparatus 100 and a GPS antenna 224 to receive GPS satellite signals for use by the location determining component 202 and/or processor 206.

The secondary communications element 214 is generally similar to the secondary communications element 112 of the tracking apparatus 100 and is operable to communicate with the tracking apparatus 100 or other external device independent of the primary communications element 212. The secondary communications element 214 is operable to transmit and receive information to and from the tracking apparatus 100 independent of the primary communications element 212. The secondary communications element 214 may be operable to utilize WiFi (802.11), Bluetooth, ultra-wideband (UWB), Wi-Max, Wireless USB, ZigBee, and/or other conventional wireless data transfer protocols to efficiently transfer data between the tracking apparatus 100 and the navigation unit 200.

The power source 216 provides electrical power to various navigation unit 200 elements any may comprise conventional power supply elements, such as batteries, battery packs, fuel cells, solar cells and solar elements, etc. The power source 216 may also comprise power conduits, connectors, and receptacles operable to receive batteries, battery connectors, or power cables. For example, the power source 216 may include both a battery to enable portable operation and a power input for receiving power from an external source such an automobile.

The display 218 is coupled with the processor 206 and/or other navigation unit 200 elements and is operable to display various information corresponding to the navigation unit 200, such as tracking information, maps, locations, and other information as is described below. The display 218 may be monochrome or color and comprise display elements including, but limited to, CRT and LCD devices. As described above, the display 218 may include a touch-screen display to enable the user to interact with the display 218 by touching or pointing at display areas to provide information to the navigation unit 200.

The housing 220 may be handheld or otherwise portable to facilitate transport of the navigation unit 200 between locations. The housing 220 may be comprised of generally conventional, substantially waterproof, and durable materials, such as ABS, other plastics, metals, etc, to protect the enclosed and associated elements when the navigation unit 200 is utilized in potentially inclement conditions such as those encountered while hunting.

Embodiments of the present invention may also comprise one or more computer programs stored in or on the memory 108 or 208 or other computer-readable medium residing on or accessible by the tracking apparatus 100 or navigation unit 200. The computer programs may comprise listings of executable instructions for implementing logical functions and can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be the memory 108 or 208 or any other non-transitory means that can contain, store, or communicate the programs. The computer-readable medium can be, for example, but not limited to, an electronic, magnetic, optical, electro-magnetic, infrared, or semi-conductor system, apparatus, or device.

Figure 9:
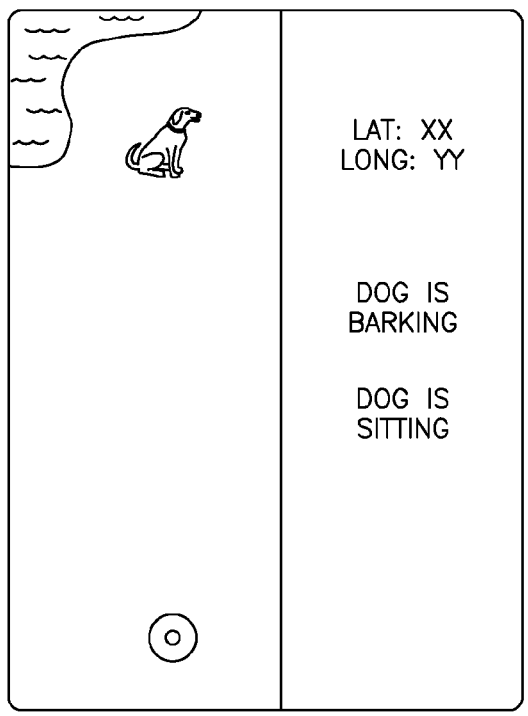
FIG. 9 is a sample screen display of the navigation unit showing a representation of the location of a tracked animal and a sensed condition of the animal.

Certain operational aspects of the above-described tracking apparatus 100 and navigation unit 200 will now be described with reference to the screen displays of FIGS. 9 and 10 and the flow charts of FIGS. 11 and 12. Some of the blocks of the flow charts may represent a step or steps in a method or a module segment or portion of code of computer programs of the present invention. In some alternative implementations, the functions noted in the various blocks may occur out of the order depicted in the flow charts. For example, two blocks shown in succession in FIG. 11 or 12 may in fact be executed substantially concurrently, or the blocks may sometimes be executed in the reverse order depending upon the functionality involved.

FIG. 11 depicts a method 1100 and/or portions of a computer program in which the tracking apparatus 100 senses a condition of the animal A and then automatically acquires and stores location information corresponding to the geographic location of the apparatus at which the condition was sensed. The tracking apparatus 100 may store the location information as a waypoint at which the condition of the animal was sensed and may also store condition information corresponding to the sensed condition and associate the condition information with the location information in memory. When the sensor includes a microphone or other sound sensing device as described above, the processor 106 may monitor an output of the microphone and store location information for the location of the apparatus 100 whenever barking or other noises are sensed. In some embodiments, the processor 106 may compare the sounds to a threshold volume or duration or a selected spectral content and automatically store the location information only when the sounds exceed the threshold or match the spectral content. The locations of the animal subsequent to sensing of the condition may similarly be acquired and stored so that a track log of the animal's response to the sensed condition may be established.

The method 1100 of FIG. 11 begins when an animal condition is sensed as shown in step 1102. The sensed animal condition may be acquired by the tracking apparatus 100 using the sensor 104 and may be any animal condition that a trainer, hunter, or other person may wish to observe or analyze. In one embodiment, the sensed condition includes barking or other sounds made by the animal as detected by a microphone or other sound sensing device. The sensed condition may also comprise the posture of the animal, such as if the animal is sitting, standing, treeing, or pointing. The sensed condition may also be related to movement of the animal, such as if the animal is moving, stationary, or running. The sensed condition may also relate to the location, velocity, acceleration, or heading of the animal. As should be appreciated, any condition or combination of conditions may be sensed by the sensor 104 or otherwise acquired in step 1102.

The sensor 104 may continuously or at regular intervals sense animal conditions and generate signals, data, or other information corresponding to the sensed conditions. In some embodiments, animal conditions may be sensed and/or acquired at a user-defined or pre-defined interval, such as every thirty seconds, every minute, etc, to conserve the power source 114 and lengthen the time in which the tracking apparatus 100 may be utilized for tracking. In some configurations, the interval may be determined by thresholds in movement, barking, and the like, instead of time.

In some embodiments, the processor 106 may attempt to identify certain target animal conditions as shown in step 1104 such that location information is only stored for these target animal conditions. For example, when the sensor 104 includes a sound sensing device, the processor 106 may compare detected sounds to a threshold volume, spectral content or duration and attempt to identify sounds that exceed the threshold or match the spectral content. In one embodiment, the processor 106 attempts to identify detected sounds that exceed a decibel level of 60 dB, which is a typical volume of dog barking. In other embodiments, the processor 106 attempts to identify sounds that match a frequency pattern (or other spectral content) unique to dog barking. The processor 106 may be configured to identify sounds corresponding to particular types of dog barking, such as nuisance barking, panic barking, animal treed barking, and the like.

In still other embodiments, the processor 106 attempts to identify sounds that occur for a pre-determined time interval such as two seconds or more. This ensures that only desired animal conditions result in the acquisition and storage of corresponding geographic location information as described below. The threshold or thresholds may be user-configurable to match characteristics of a particular tracked animal and may be adjusted and/or changed.

The tracking apparatus 100 may also acquire sensed ambient conditions and/or tracking apparatus 100 conditions in steps 1102 or 1104. For instance, as discussed above, the sensed condition or conditions may include an ambient temperature, a remaining power level of the tracking apparatus 100, etc.

In some embodiments, the processor 106 and sensor 104 may cooperate to acquire one or more sensed conditions. For instance, the sensor 104 may acquire the orientation of the housing 116 and the processor 106 may determine the posture of the animal based on the acquired orientation. Further, the processor 106 may use a combination of information acquired from the location determining component 102, the memory 108, and the sensor 104 to acquire sensed conditions. For example, the processor 106 may compare a currently sensed condition to a previously sensed condition, use information acquired from the sensor 104 and the location determining component 102 to determine the status, posture, or movement of the animal, etc. In some configurations, the sensed condition may be the application of stimulation by the stimulation element 109.

After an animal condition is detected, the current geographic location of the tracking apparatus 100 is acquired as shown in step 1106. Thus, the current geographic location is acquired (and then stored as described below) in response to the detection of the animal condition. The current geographic location of the tracking apparatus 100, and thus the animal to which the tracking apparatus 100 is mounted, may be acquired and determined using the location determining component 102. Thus, for instance, the current geographic location may be determined in step 1106 by receiving GPS signals (and/or other GNSS signals) and computing the current geographic location from the received GPS signals. The geographic locations of the apparatus 100 may be acquired and determined utilizing other methods, such as by retrieving the current geographic location from the memory 108 or from one or both of the communications elements 110, 112. Similarly, the processor 106 may calculate the current geographic location of the tracking apparatus 100 utilizing information and data stored within the memory 108. In various configurations, the location of the animal may be tracked using the location determining component 102 and stored a period of time subsequent to detection of the animal condition. Thus, the animal's response to the sensed condition may be tracked.

In addition to acquiring the location of the tracking apparatus 100 in response to the acquisition of a sensed animal condition, the current location of the tracking apparatus 100 may be continuously or periodically acquired to provide an accurate representation of the location of the tracking apparatus 100 independent of sensed animal conditions. In some embodiments, the current geographic location of the apparatus may be acquired at a user-defined or pre-defined interval, such as every thirty seconds, every minute, etc, to conserve the power source 114 and lengthen the time in which the tracking apparatus 100 may be utilized for tracking.

Information relating to the sensed animal condition acquired in step 1102 and the corresponding location of the tracking apparatus 100 acquired in step 1106 is then stored within the memory 108 as depicted in step 1108. In some embodiments, the location information for each sensed animal condition is stored as a waypoint at which the animal condition was sensed. For example, each time barking is detected, the processor 106 may automatically acquire the current geographic location of the apparatus 100 and store the location as a waypoint for the barking. The processor may also store information representative of the barking or other sensed condition and associate the information for the sensed condition with the waypoint. The information may be stored within the memory 108 for later use and analysis by the processor 106, the navigation unit 200, and/or the user P. In some embodiments, step 1108 may be performed each time steps 1102 and 1106 are performed such that information for every sensed animal condition and its corresponding location is stored within the memory 108. In other embodiments, only certain information is stored. For example, step 1108 may only store information after a selected number of animal conditions (e.g. two or more) are sensed.

As multiple sensed animal conditions are acquired as described above, a database or other organized listing of sensed conditions and corresponding geographic locations may be formed or otherwise stored within the memory 108. By storing information for a plurality of sensed animal conditions and corresponding locations within the memory 108, the user P or other person may later analyze the stored data for tracking or training purposes. In embodiments where the memory 108 is removable, the user may remove the memory 108 and couple the memory 108 with a computing element or the navigation unit 200 to further analyze the stored information. For example, a user may analyze the information to determine locations where a dog frequently barked, sat, pointed, or exhibited any other animal conditions such as a response to stimulation or training commands. Such locations may indicate the presence of game or other targets and/or the effectiveness of training.

In step 1110, information relating to the sensed animal conditions and the corresponding locations of the tracking apparatus 100 may be transmitted to the navigation unit 200 or another external device. In some embodiments, the primary communications element 110 is used to transmit the information so that the information may be received from significant ranges, such as those greater than a half mile. In other embodiments, it may be desirable to transmit the information with the secondary communications element 112, such as where the navigation unit 200 and tracking apparatus 100 are in close proximity and rapid transfer of information is desirable. In other configurations, the same communications element may be used to transmit the information with varying signal power depending on desired range.

The information may be transmitted as soon as it is stored or only at user-defined or pre-defined intervals, such as every 2.5 seconds, 5 seconds, 10 seconds, 15 seconds, 30 seconds, 1 minute, 5 minutes, etc, to conserve the power source 114. The information may also be transmitted only upon user prompt. The information may be transmitted simultaneously or in rapid sequence. Thus, for instance, every sixty seconds the primary communications element 212 may transmit all information for sensed animal conditions and corresponding geographic locations that were stored within the memory 108 within the previous sixty seconds. Such a configuration reduces power consumption while still allowing the navigation unit 200 or other remote device to receive comprehensive information regarding the tracking apparatus 100.

When no sensed animal condition is acquired, step 1110 may still transmit information for the current geographic location of the apparatus 100. This enables tracking of the animal independent of the sensing of animal conditions.

The navigation unit 200 may store the received animal condition information and the corresponding location information within its memory 208. All information and data received from the tracking apparatus 100 may be stored within the memory 208 in an ordered listing or database to enable subsequent analysis. However to reduce required memory capacity, in some embodiments, only portions of the received information are stored within the memory 208, such as the locations and conditions received within the last two hours, or any other interval.

The memory 208 of the navigation unit 200 may also store cartographic information such as maps, terrain and elevation information, points of interest, street and thoroughfare information, navigation information, or any other information corresponding to various locations. The processor 206 is operable to access the memory 208 and cartographic information according to the current geographic location of the tracking apparatus 100.

For instance, the processor 206 may consider the received current geographic locations of the tracking apparatus 100, access a database of cartographic information stored within the memory 208, and retrieve cartographic information corresponding to the tracking apparatus 100 location. Such cartographic information may include a map of the area surrounding the current tracking apparatus 100 location. Similarly, the processor 206 may access cartographic information corresponding to previously acquired geographic locations or predicted future locations of the tracking apparatus 100.

The navigation unit 200 may also generate and display a representation of the tracking apparatus location 100 at the time an animal condition is sensed as well as a representation of the sensed condition. The processor 206 may generate such representations on a map to enable the user to easily identify the location of the animal and tracking apparatus 100 and the sensed condition. The sensed condition and location information may be represented with a graphical indication or an audible indication, such as voice information relating to the acquired information. For example, a graphic of a barking dog may be displayed at the location where barking was sensed as shown in FIG. 9. The representation may also indicate the sensed conditions and corresponding locations utilizing text, such as an indication that the dog is barking, the location of the barking, and a description of the animal's posture as shown in FIG. 9.

The processor 206 may also present the information for the sensed conditions and corresponding locations in list or table form to enable a user to quickly view a number of sensed animal conditions and corresponding locations. The information may also be grouped such that information for the same or similar sensed conditions is displayed together.

The navigation unit 200 may access cartographic information each time information is received from the tracking apparatus 100. Such a configuration ensures that the processor 206 generates accurate representations of the area in proximity to the tracking apparatus 100. However, to conserve navigation unit 200 resources, in some embodiments cartographic information may be accessed only a certain intervals, such as every 15 seconds, 30 seconds, etc. In some embodiments, the navigation unit 200 may access cartographic information stored on other devices. For example, the secondary communications element 214 may access the Internet or other external devices to retrieve cartographic information corresponding to the acquired tracking apparatus 100 location.

The navigation unit 200 may also display a representation of the current location of the tracking apparatus 100 that is independent of the current location of the navigation unit 200 such that the absolute position of the tracking apparatus 100 is provided. "Absolute position" as utilized herein refers to a position or location that is not dependent on the location of the navigation unit 200, such as a particular latitude or longitude or a position of the tracking apparatus 100 on a map as shown in FIGS. 9 and 10. Use of absolute positions to represent the location of the tracking apparatus 100, in contrast to purely relational representations based on the current location of the navigation unit 200, enables the user to quickly and easily identify the location of the animal utilizing cartographic information, such as landmarks, street intersections, etc, instead of purely relational information which may be of limited value to the user independent of cartographic information.

As discussed above, the cartographic information may additionally or alternatively include terrain and elevation information. Consequently, the processor 206 may generate a representation of the tracking apparatus 100 and animal showing the animal on grass, near water, at a certain elevation, on a path, on a road, etc. Such terrain and elevation information further assists the user in tracking the animal by providing the user additional information regarding the animal's current location. As should be appreciated, any cartographic information accessed by the navigation unit 200 may be utilized to generate and display the representation of the current geographic location of the tracking apparatus 100.

The generated and displayed information may also include a representation of the current geographic location of the navigation unit 200. For instance, as shown in FIGS. 9 and 10, the current geographic location of the navigation unit 200 may be displayed as two concentric circles. By representing absolute unit and apparatus locations utilizing cartographic information, the user P may easily identify his or her own location, the location of the animal A, and the best route from the current navigation unit location to the current tracking apparatus location. Further, in some embodiments the processor 206 may generate a route to the current tracking apparatus 100 location using the accessed cartographic information. The route may be dynamically updated as the position of the navigation unit 200 and tracking apparatus 100 changes.

The generated and displayed representations may also include relational information regarding the current and previous locations of the tracking apparatus 100 and navigation unit 200. For instance, the generated and displayed representations may include information such as the bearing, direction, and/or distance to the tracking apparatus 100 from the navigation unit 200. Use of both relational and absolute location information enables the user to efficiently track the animal based on cartographic or directional information.

In some embodiments, the generated and displayed representations may also include supplemental tracking information formed utilizing a plurality of received tracking apparatus 100 locations. For instance, the supplemental tracking information may include the speed and acceleration of the tracking apparatus 100, a plot or display of previous tracking apparatus 100 locations, a projected future path or route of the tracking apparatus 100 and/or animal, the direction, bearing, or heading of the tracking apparatus 100, etc.

Additional features provided by embodiments of the present invention are depicted in the flow chart FIG. 12, which illustrates a method 1200 and/or portions of a computer program in which one of the communications elements 110, 112 of the tracking apparatus 100 receives a command from the navigation unit 200 or another remote unit and the sensor 104 senses a response to the command made by the animal. For instance, the command from the navigation unit 200 may cause activation of the stimulation element 109 to provide a desired amount of stimulation to the animal. The processor 106 then monitors the sensor 104 to identify a desired response to the command and stores response information corresponding to the response in the memory. In one configuration, the sensor 104 may include the location determining component 102 and determine the position, direction, and/or speed of the animal subsequent to activation of the stimulation element 109. For example, after receiving a command (e.g., return, recall, barking cessation, listen to handler, trashbreaking, combinations thereof, and the like) from the navigation unit 200, which causes appropriate activation of the stimulation element 109, the processor 106 may monitor the sensor 104 to determine if the animal correctly responds in a response to the command (e.g., stops and changes direction in response to a return command). In some embodiments, the processor 106 may monitor a time duration between receipt of a command and the corresponding response of the animal and store time information corresponding to the time duration in the memory. Similarly, the locations of the animal subsequent to application of the "return" command may be monitored to determine the animal's reaction to the stimulation applied by the stimulation element. Such functionality enables the animal trainer to determine if the animal is reacting appropriately to stimulation provided by the stimulation element 109.

The method 1200 of FIG. 12 begins when the tracking apparatus 100 receives a command as shown in step 1202. The command may be sent from the navigation unit 200 or any other external device and may be received by the communications element 110 or 112. The received command may trigger stimulation by the tracking apparatus 100 or a device coupled with the tracking apparatus. For example, the command may trigger stimulation via the stimulation element 109 that the animal A is trained to recognize as a command to return to its owner and/or handler. The command may also be a voice command reproduced on a speaker of the tracking apparatus or other form of stimulation.

A response to the command, if any, is then sensed in step 1204. The response may be sensed by the tracking apparatus 100 using the sensor 104. The sensed response may correspond to the animal's movement, such as its heading, speed of travel, etc. The sensed response may also correspond to the posture of the animal, such as if the animal is sitting, standing, or pointing. The sensed response may also include barking or other sounds made by the animal, or the cessation of sounds, as detected by the microphone or other sound sensing device. Thus, the sensed response (e.g., barking) may be independent of application of the command in configurations where, for instance, the tracking apparatus 100 is utilized to record locations where the tracked animal barks. Any combination of responses may be sensed by the sensor 104 for acquisition in step 1202.

In some embodiments, the processor 106 may attempt to identify certain target responses as shown in step 1206. To do so, certain commands may be correlated with certain responses in the memory 108. The processor may access the memory and attempt to identify a particular response when a particular command is received. For example, a "return" command may be associated with a response in which the animal runs toward the navigation unit 200. The processor may attempt to identify such a response in step 1204 when a "return" command is received in step 1202.

The sensor 104 may continuously or at regular intervals sense responses and generate signals, data, or other information corresponding to the responses. In some embodiments, the processor 106 and sensor 104 may cooperate to acquire one or more sensed responses. For instance, the sensor 104 may acquire the orientation of the housing 116 and the processor 106 may determine the posture of the animal based on the acquired orientation. Further, the processor 106 may use a combination of information acquired from the location determining component 102, the memory 108, and the sensor 104 to acquire a sensed response. For example, the processor 106 may compare a currently sensed response to a previously sensed response, use information acquired from the sensor 104 and the location determining component 102 to determine the status, posture, or movement of the animal, etc.

After a response to a command is detected, the geographic location of the tracking apparatus 100 at the time of the response is acquired as shown in block 1208. Thus, a geographic location is acquired (and then stored as described below) in response to the detection of a response to a command. In some embodiments, the location of the apparatus is also acquired when a command is received. The geographic locations of the tracking apparatus 100, and thus the animal to which the tracking apparatus 100 is mounted, may be acquired and determined as described above.

In addition to acquiring the geographic location of the tracking apparatus in response to receipt of a command and/or a sensed response to the command, the current geographic location of the tracking apparatus 100 may be continuously or periodically acquired to provide an accurate representation of the location of the tracking apparatus 100 even when no commands are given or responses are sensed.

The tracking apparatus 100 may also acquire the current date and time at which a command is received and a response to the command is detected as shown in step 1210. The time information may be acquired with an internal clock of the processor 106 or from other sources. The processor 106 may then calculate and store information corresponding to the elapsed time between receipt of a command and detection of a desired response to the command.

In step 1212, information relating to the received command, the detected response, the corresponding geographic locations of the tracking apparatus, and the corresponding time and date information is stored within the memory 108. The geographic locations may be stored as waypoints at which the commands were received and/or the responses were detected. For example, each time a command is received, the processor 106 may automatically acquire the geographic location of the apparatus and store the location as a waypoint. Similarly, each time a response to a command is detected, the processor 106 may acquire and store the current location of the tracking apparatus. The processor may also store information representative of the command and response as well as the elapsed time information along with the location information. In some embodiments, step 1212 may be performed each time steps 1202 and 1204 are performed such that information for every command, response, and corresponding location is stored within the memory 208. A database or other organized listing of commands, responses, time information and corresponding geographic locations may be formed or otherwise stored within the memory 208.

In step 1214, information relating to the commands, responses, locations, and times may be transmitted to the navigation unit 200 or another external device. The primary communications element 110 or the secondary communication element 112 may be used to transmit the information. Information corresponding to the sensed conditions and corresponding current geographic locations of the tracking apparatus 100 may be transmitted as soon as it is stored, at user-defined or pre-defined intervals or upon user prompting.

The navigation unit 200 may store all information received from the tracking apparatus 100 within the memory 208 for use by the processor 206 and/or user. All information and data received from the tracking apparatus 100 may be stored within the memory 208 in an ordered listing or database to enable subsequent analysis.

The memory 208 of the navigation unit may also store cartographic information such as maps, terrain and elevation information, points of interest, street and thoroughfare information, navigation information, or any other information corresponding to various locations. The processor 206 is operable to access the memory 208 and cartographic information according to the current geographic location of the tracking apparatus 100.

The navigation unit 200 may access cartographic information each time information is received from the tracking apparatus 100. Such a configuration ensures that the processor 206 generates accurate representations of the area in proximity to the tracking apparatus 100. However, to conserve navigation unit 200 resources, in some embodiments cartographic information may be accessed only a certain intervals, such as every 15 seconds, 30 seconds, etc.

The navigation unit 200 may also generate and display representations of sent and/or received commands, the responses to the commands, the elapsed time between a command and a response, and the corresponding locations. For example, the navigation unit 200 may display the number of times a particular condition was sensed (e.g., bark odometer, treed conditions, times on point), the number of times and locations where a command was sent or received, combinations thereof, and the like. In one configuration, the navigation unit 200 may present a graphical map that indicates the location where each condition was sensed (which may indicate the location of coon trees, coveys, etc.) and the location of the tracking apparatus 100 when commands were sent from the navigation unit 200.

Figure 10:
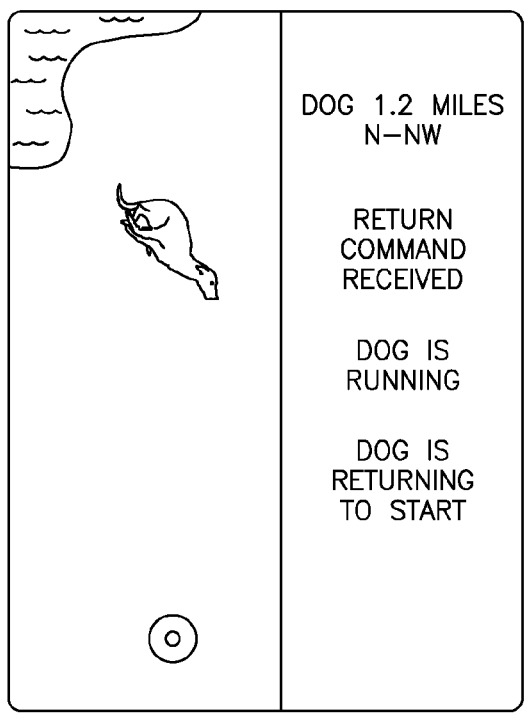
FIG. 10 is a sample screen display of the navigation unit showing representations of a location of a tracked animal and a response to a command.

As shown in FIG. 10, the processor 206 may generate and display a map representation of the location of the tracking apparatus 100 when a response to a command was sensed to enable the user to easily identify the location of the animal and tracking apparatus 100 when the animal exhibits the response. The generated and displayed representation may also include an indication of the command and/or the response. The command or the response may be represented utilizing a graphical indication, such as an image of a dog returning to its handler and/or a heading indicator indicating the animal's most recent position. For example, a graphic of a running dog may be displayed at the location where a desired response to a command was sensed as shown in FIG. 10. The representation may also indicate the sent and/or received command, the sensed response and corresponding locations utilizing text, such as an indication that the dog is returning and a description of the animal's location and heading as shown in FIG. 10.

The generated and displayed information may also include a representation of the current geographic location of the navigation unit 200 and other location and tracking information as explained in detail below.

Figure 8:
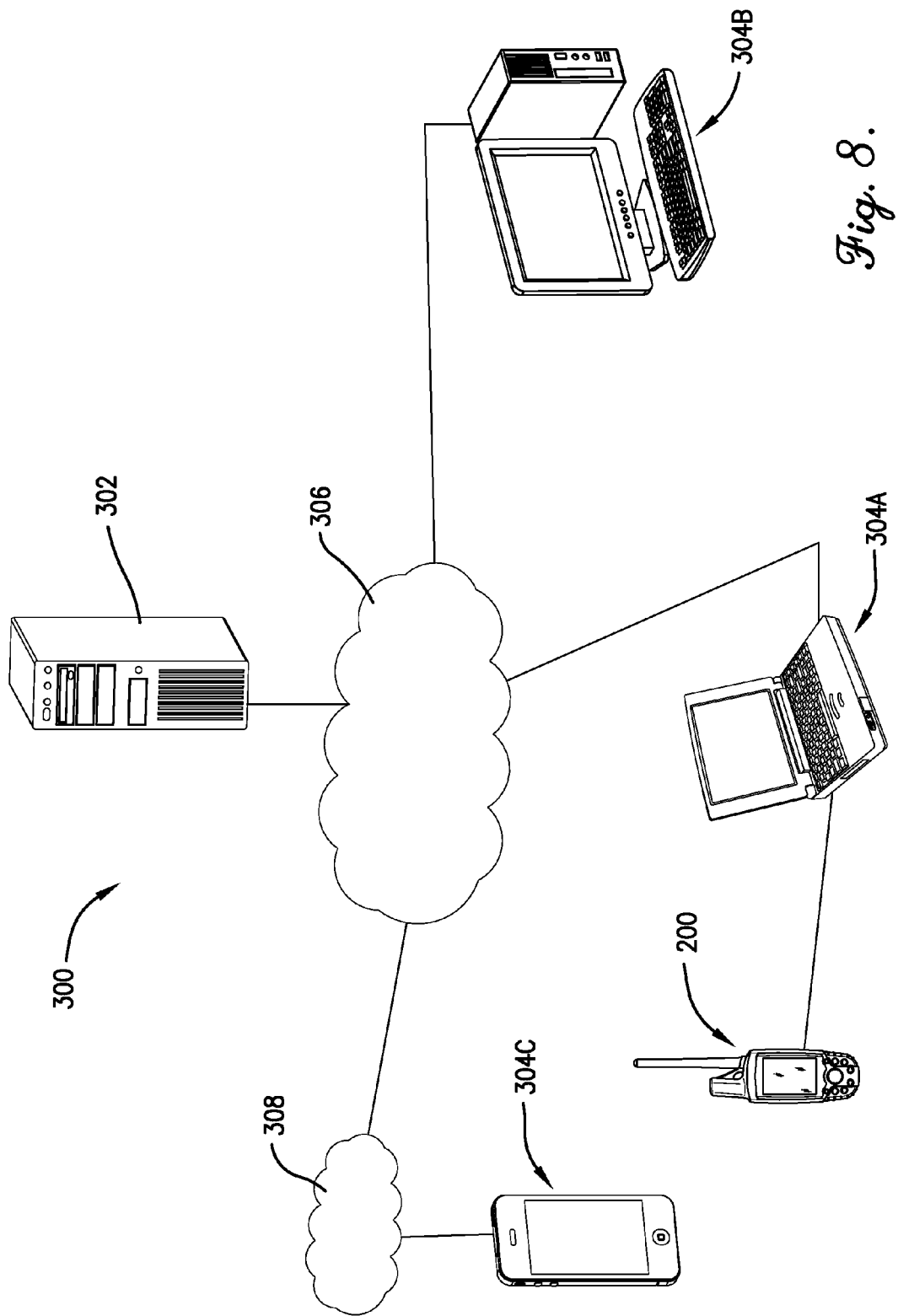
FIG. 8 is a schematic representation of computer and communications equipment that may be used with embodiments of the invention.

Other embodiments of the invention may be implemented with a computer and communications system 300 shown in FIG. 8 and one or more computer programs for operating components of the system 300. One embodiment of the system 300 includes a computer or computer system 302 that may be accessed by one more personal computing devices 304A,B,C via a communications network 306. The devices in the system 300 may be operated by any persons or entities.

The computer system 302 receives, stores, and provides access to the information described in connection with the methods 1100 and 1200 and other information. The computer system 302 may also implement one or more computer programs for performing some of the functions described herein and may provide a web-based portal that can be accessed by the personal computing devices 304A,B,C, and other devices.

Embodiments of the computer system 302 may include one or more servers. The computer system 302 includes or has access to computer memory and other hardware and software for receiving, storing, accessing, and transmitting information as described below. The computer system 302 may also include conventional web hosting operating software, searching algorithms, an Internet connection, and may be assigned a URL and corresponding domain name so that it can be accessed via the Internet in a conventional manner.

The personal computing devices 304A,B,C may be any devices used by users of the tracking apparatus 100 and/or the navigation unit 200. The personal computing devices 304A, B,C may be desktop computers, laptop computers, tablet computers, mobile phones, or similar devices as shown. Each personal computing device may include or can access an Internet browser and a conventional Internet connection such as a wireless broadband connection so that it can exchange data with the computer system 302 via the communications network 306. One or more of the devices 304A,B,C may also exchange data with the tracking apparatus 100 and/or the navigation unit 200 via a wired or wireless data link as illustrated. In some configurations, the tracking apparatus 100 and navigation unit 200 may be operable to directly communicate with the network 306 without utilizing device 304A or other intermediate computing devices.

The communications network 306 may be the Internet or any other communications network such as a local area network, a wide area network, or an intranet. The communications network 306 may include or be in communication with a wireless network 308 capable of supporting wireless communications such as the wireless networks operated by AT&T, Verizon, or Sprint. The wireless network 306 may include conventional switching and routing equipment. The communications network 306 and wireless network 308 may also be combined or implemented with several different networks.

The components of the system 300 illustrated and described herein are merely examples of equipment that may be used to implement embodiments of the present invention and may be replaced with other equipment without departing from the scope of the present invention. Some of the illustrated components of the system may also be combined.

Embodiments of the present invention may also comprise one or more computer programs stored in or on computer-readable medium residing on or accessible by the computer system 302 or the personal computing devices 304A,B,C. The computer programs may comprise listings of executable instructions for implementing logical functions in the computers and can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions.

In accordance with various embodiments of the invention, a computer program stored on non-transitory computer readable medium is provided for directing operation of the computer system 302 to provide an Internet accessible portal for animal tracking and training information. The computer program may comprise a code segment for receiving location data representative of a location of an animal tracking apparatus at the time an animal wearing the animal tracking apparatus exhibited a condition; a code segment for accessing cartographic data for an area near the location; a code segment for creating a representation of the location with the location data and the cartographic data; and a code segment for permitting users to access the computer via a communications network and display the representation of the location of the animal tracking apparatus at the time the animal wearing the animal tracking apparatus exhibited the condition.

The computer program may further comprise a code segment for receiving condition information corresponding to the condition of the animal and a code segment for displaying a representation of the condition information alongside the representation of the location. As described in connection with other embodiments of the invention, the condition of the animal may include barking or other sounds made by the animal.

In accordance with another aspect of the invention, a computer program stored on non-transitory computer readable medium is provided for directing operation of the computer system 302. An embodiment of the computer program comprises a code segment for receiving location data representative of a location of a first animal tracking apparatus at the time an animal wearing the first animal tracking apparatus exhibited a condition; a code segment for receiving location data representative of a location of a second animal tracking apparatus at the time an animal wearing the second animal tracking apparatus exhibited a condition; a code segment for accessing cartographic data for an area that encompasses the location of the first and second animal tracking apparatuses; a code segment for creating a representation of the location of the first animal tracking apparatus and of the location of the second animal tracking apparatus using the location data and the cartographic data; and a code segment for permitting users to access the computer and display the representation of the location of the first animal tracking apparatus at the time the animal wearing the first animal tracking apparatus exhibited the condition and of the location of the second animal tracking apparatus at the time the animal wearing the second animal tracking apparatus exhibited the condition. Of course, the computer program may be utilized to receive, analyze, display, and the compare the locations of multiple animals and associated sensed conditions.

The computer program may further comprise a code segment for receiving condition information corresponding to the condition of the first animal and a code segment for displaying a representation of the condition information alongside the representation of the location of the first animal. The computer program may further comprise a code segment for receiving condition information corresponding to the condition of the second animal and a code segment for displaying a representation of the condition information alongside the representation of the location of the second animal.

The above-described computer programs may also receive, store, display, and provide access to information relating to the commands and associated responses of the methods 1200 described above. Such functionality enables the training performance of the animal to be evaluated to determine if the animal reacted appropriately to applied stimulation. For example, the system 300 may used to determine if a particular animal, or a group of animals, reacted appropriately to applied stimulation. Additionally, such functionality enables users, each having different animals, to share data regarding their animals, sensed conditions, and/or training performance. Thus, a web site can be provided where users can view maps containing track locations and associated sensed conditions of various animals, thereby providing insight into desirable hunting locations and practices. For instance, a hunter could view of map of his or her preferred hunting grounds to see where suitably-equipped hunting dogs, owned by multiple users, encountered prey (e.g., through the locations of the sensed conditions indicating barking, going on point, treeing prey, and/or the like). Although the hunter may be unlikely to share this information, events and competitions could aggregate this, and similar, information to compare different dogs, to determine which dog was first to tree an animal, to determine how closely a laid down scent was tracked by dogs, to determine how many times the dog lost a scent and rediscovered it, combinations thereof, and the like.

The functionality provided through the web site and/or system 300 may include social functionality similar to that provided by Garmin Connect, Facebook, Twitter, and other social media portals. Thus, sharing and distribution of the sensed conditions and associated locations of various animals through the system 300 enables users to gain helpful information regarding equipped animals and geographic locations.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. An animal tracking apparatus operable to be worn by an animal, the apparatus comprising:
    a location determining component operable to determine a current geographic location of the apparatus;
    a sensor operable to sense a condition of the animal;
    a communications component operable to receive command information and transmit stored location information, a status for the command information and condition information corresponding to the sensed condition of the animal;
    a memory operable to store the location information, the status for the command information, and the condition information; and
    a processor coupled with the location determining component, the sensor, the communications component, and the memory and operable to determine the status for the command information and automatically store location information corresponding to the current geographic location of the apparatus in response to a sensed condition of the animal and condition information in the memory.

2. The apparatus of claim 1, wherein the processor stores the location information as a waypoint at which the condition of the animal was sensed.

3. The apparatus of claim 1, wherein the processor is further operable to associate the condition information with the location information in the memory.

4. The apparatus of claim 1, wherein the sensor is a microphone and the sensed condition includes barking or other sounds made by the animal.

5. The apparatus of claim 4, wherein the processor is operable to compare the sounds to spectral content and store the location information based on the comparison.

6. The apparatus of claim 1, wherein the sensor is an accelerometer and the sensed condition includes barking or other sounds made by the animal.

7. The apparatus of claim 1, wherein the sensed condition of the animal further comprises a posture of the animal, an orientation of the animal, a temperature of the animal, or a heart rate of the animal.

8. The apparatus of claim 1, wherein the communications component transmits the location information, the status for the command information, and the condition information to a remote navigation unit.

9. The apparatus of claim 1, wherein the location determining component comprises a Global Positioning System (GPS) receiver and utilizes received GPS signals to determine the current geographic location of the apparatus.

10. An animal tracking system comprising:
    an animal tracking apparatus operable to be worn by an animal, the apparatus comprising:
        a location determining component operable to determine a current geographic location of the apparatus;
        a sensor operable to sense a condition of the animal;
        a communications component operable to receive command information and transmit stored location information corresponding to the geographic location of the apparatus, a status for the command information and condition information corresponding to the sensed condition of the animal;
        a memory operable to store location information, the status for the command information, and the condition information;
        a processor coupled with the location determining component, the sensor, the communication component, and the memory and operable to determine the status for the command information and store in memory, in response to a sensed condition of the animal, location information corresponding to the current geographic location of the apparatus and condition information corresponding to the sensed condition; and
    a portable navigation unit comprising:
        a location determining component operable to determine a current geographic location of the unit;
        a communications component operable to transmit command information and receive the location information, the status for the command information and the condition information from the animal tracking apparatus;
        a memory operable to store the received location information, the status for the command information, and the condition information;
        a processor coupled with the location determining component, the communications component, and the memory, the processor operable to:
            determine heading information of the animal tracking apparatus based on the received location information, and
            generate a representation of the determined heading information and the location information, the status for the command information and the condition information received from the animal tracking apparatus; and
        a display operable to display the generated representation of the determined heading information, the location information, the status for the command information, and the condition information.

11. The system of claim 10, wherein the processor of the portable navigation unit is further operable to generate a representation of the current geographic location of the unit and the display is operable to display the generated representation of the location of the unit.

12. The apparatus of claim 10, wherein the processor of the animal tracking apparatus stores the location information as a waypoint at which the condition of the animal was sensed in the memory of the portable navigation unit.

13. The apparatus of claim 10, wherein the sensor is a microphone and the sensed condition of the animal includes barking or other sounds made by the animal.

14. The apparatus of claim 13, wherein the processor of the animal tracking apparatus is operable to compare the sounds made by the animal to spectral content and automatically store the location information and the condition information based on the comparison in the memory of the portable navigation unit.

15. An animal tracking apparatus operable to be worn by an animal, the apparatus comprising:

a location determining component operable to determine a current geographic location of the apparatus;

a communication component operable to receive a command from a remote unit and transmit stored location information, a status for the command and response information corresponding to a sensed response of the animal;

a sensor operable to sense a response to the command made by the animal;

a memory operable to store the location information, the status for the command, and the response information; and a processor coupled with the location determining component, the communications component, the sensor, and the memory and operable to determine the status for the command information, store location information, and monitor the sensor and store response information corresponding to the response in the memory.

16. The apparatus of claim 15, wherein the processor is operable to monitor a time duration between receipt of the command and the response and to store time information corresponding to the time duration in the memory.

17. The apparatus of claim 15, further comprising a stimulation element coupled with the processor and operable to provide feedback to the animal upon receipt of the command.

18. The apparatus of claim 15, wherein the sensor is a position sensor and the response is a desired posture of the animal.

19. The apparatus of claim 15, wherein the sensor is the location determining component and the response is one or more locations of the animal.

20. The apparatus of claim 15, wherein the stored location information corresponds to a geographic location at which the command was received and to a geographic location at which the response was sensed.

* * * * *